Patented Jan. 9, 1940

2,186,792

UNITED STATES PATENT OFFICE 2,186,792

CEMENT MANUFACTURE

George C. Wilsnack, Easton, Pa., assignor, by direct and mesne assignments, of one-half to Edison Cement Corporation, New Village, N. J., a corporation of New Jersey, and one-half to Binney & Smith Company, New York, N. Y., a corporation of New Jersey No Drawing. Application May 12, 1937, Serial No. 142,322

8 Claims. (Cl. 106—24)

This invention relates to an improved process for the production of Portland cement. It relates more particularly to a process by which the cost of reducing the raw clinker from the kiln to the fine powder which constitutes ordinary Portland cement may be greatly reduced, or by which the particle size of the Portland cement may be greatly reduced. By this process, Portland cement which has a particle size substantially smaller than that of ordinary Portland cement and hence has an increased specific surface and improved properties may be readily prepared. This Portland cement contains a dispersing or separating element or agent which not only effectively promotes the efficiency of the grinding operation, but also improves the properties of the cement, the dispersing or separating element or agent serving to make the cement particles more available for hydration; and this improved Portland cement may be advantageously used for the production of concrete in mixes requiring substantially less water and having a finer texture and better working properties, with the production of a denser concrete which is stronger and less permeable and has fewer voids, and which contains no added agent which might tend to leach out or to deleteriously effect the cement or concrete made therefrom.

Portland cement is commonly made by crushing together argillaceous and calcareous materials in definite proportions and passing the resulting mixture through a rotating kiln in which the pulverized material is subjected to high temperatures. The material leaves the kiln in the form of a clinker, which is then ground to a fine state of subdivision to form the ordinary Portland cement. Before this grinding operation, a small amount of gypsum is generally added to adjust the $SO_3$ content of the final product to give it desirable setting characteristics.

The grinding of the raw clinker to produce the finished Portland cement requires a great amount of power, and involves a very substantial expense, representing one of the major items of expense in the production of cement. When the process of the present invention is used, the time, and hence the power, required for this grinding operation, and of course, the cost, may be greatly reduced, reductions in the time and power requirements for this operation as great as 20% or more being easily obtained. It is known that in grinding cement clinker to produce Portland cement, there is a marked drop in the efficiency of the grinding when a certain particle size is attained, at which time the particles of cement tend to agglomerate and also tend to stick to the balls used for grinding and to the walls of the mill, so that when this stage is reached in ordinary processes for the production of cement, any greater comminution of the cement requires a disproportionate amount of power and time of grinding. When the process of the present invention is used, this drastic drop in the efficiency of grinding does not take place, the process avoiding the agglomeration of the cement particles and keeping clean the balls used in the grinding and the walls of the mill, so that Portland cement having a smaller particle size and increased specific surface (surface area in square centimeters per gram of material) may be readily produced without increased time of grinding and increased power cost.

The time at which this marked drop in the efficiency of the grinding operation takes place is commonly referred to as the end of free grinding, and occurs either when the particles of cement agglomerate, or when the balls and walls of the mill become coated, both of these phenomena exerting a cushioning effect which greatly inhibits the effectiveness of the grinding. It is an important object of the present invention to provide a process by which this cushioning effect is avoided, as is the drop in grinding efficiency.

It has been previously proposed to add various materials to the cement clinker, or to the tube mill in which the clinker is ground, to keep the balls and the walls of the mill clean, or for other purposes, such as to modify the character of the cement produced. For example, it sometimes happens that the ordinary grinding efficiency drops, and it has been proposed to add slack coal to the clinker or the tube mill as an emergency action to clean the balls and the walls of the mill so that the ordinary grinding efficiency may be resumed. It has also been proposed to add iron oxide to the clinker to darken the color of the cement produced, the iron oxide being ground along with the clinker, or to modify the chemical characteristics of the cement by adding iron oxide prior to the calcining. It has also been proposed to add certain highly active water soluble dispersing agents to the cement clinker, either to promote the incorporation of a pigment in the cement, or to improve the grinding efficiency.

None of these processes have the important advantages of the present process, either because they introduce objectionable constituents into the cement, or because they do not effect the important reduction in grinding time and power cost effected by the present invention; and none of these processes enable the production of the important improved Portland cement which may be produced by the process of the present invention.

In accordance with the present invention, there is added to the raw cement clinker a small proportion, e. g., from about 0.08% to about 0.33% or more of an extremely finely divided carbon black of substantially colloidal fineness. By carbon black, I mean the product obtained or produced by the well known impingement process, as distinguished from lamp black or thermal decomposition black, which products have a much larger particle size. To achieve the important advantages of the invention, it is essential that carbon black be used, and that it be very finely divided. Such material is available at low cost. A carbon black having an estimated average particle size of about 60 millimicrons gives very satisfactory results. The carbon black is used in a dry state, either as a dry powder or in the form of small aggregates or pellets, for example, in the form of small aggregates or pellets such as those described in the Wiegand and Venuto Patent No. 1,889,429, granted November 29, 1932. It is advantageous to use the carbon black in this latter form, as the pellets or agglomerates are very easy to handle and avoid the difficulties encountered in the use of the extremely finely divided dry powder, while giving identical results, the pellets or agglomerates being very friable and readily reduced to a powdered state identical with the carbon black in its original, dry, powdery form.

The carbon black, when so used, not only effects a marked saving in the time and power required in grinding, but also improves the properties of the cement finally obtained. In the final cement, it serves as a separating or dispersing element or agent, making the cement particles more available for hydration and enables the production of concrete mixes having a finer texture and better working properties and containing less water than comparable mixes made with ordinary cement, such mixes yielding concrete which is less permeable and has fewer voids and a denser structure. Further, the carbon black is inert and insoluble, and has no deleterious action on either the cement or concrete produced therefrom, nor does it tend to leach out of the concrete leaving voids or otherwise impairing it.

By the addition of such a small amount of dry carbon black, the time, and hence the power, required to grind the clinker, or reduce it by attrition to the finely divided state, is radically reduced, reductions as high as 20 to 30% being attained.

Advantage may be taken of this reduction in the time required for grinding by the addition of carbon black in dry form in various ways. For example, for the production of a Portland cement of a given particle size, i. e., a given specific surface, the time, and the power, required for the grinding operation may be radically reduced; or conversely, the clinker may be subjected to the same amount of grinding as usual, with the production of a cement having a greatly increased specific surface, that is, a more finely divided cement, the addition of the dry carbon black serving to prevent the marked drop in grinding efficiency which ordinarily occurs when the cement has been reduced to a certain more or less critical particle size. Furthermore, the cement so produced will have improved properties due to the presence of the extremely finely divided carbon black free from soluble dispersing agents and the like. Of course, a balance between these factors may be effected, as by carrying out the grinding operation in such a way as to decrease the time of grinding somewhat less than referred to above, while producing a cement of finer particle size than could be produced without the addition of the carbon black.

The invention will be further illustrated by the following example, although it is to be understood that it is not limited thereto.

*Example.*—Argillaceous and calcareous materials in the usual proportions are crushed and subjected to calcination at high temperatures according to customary practice. About 3% of gypsum is added to the clinker to adjust its $SO_3$ content to about 1.90%, and there is also added from about 0.08% to about 0.33% of extremely finely divided carbon black having an estimated average particle size of about 60 millimicrons in the form of small pellets or aggregates, such as described in United States Patent No. 1,889,429. These materials are then passed through the usual cement grinder in which the cement is ground, and a homogeneous product is obtained. The extent or time of grinding of the cement, and hence the power required for the grinding, may be varied within relatively wide limits. If a cement of a given specific surface is desired, the amount of power required is substantially less than would be required if the dry carbon black were not added, savings as great as 20% to 30% or even greater being easily effected. If, on the other hand, the same amount of grinding is used (i. e., the same power expended) as is ordinarily used for the production of a cement of a given specific surface, the cement obtained by this new process will have a considerably greater specific surface, in other words, will be considerably more finely divided and hence will have improved properties.

I claim:

1. In the manufacture of Portland cement, the improvement which consists in adding to the clinker before grinding a small amount of dry carbon black, the particle size of which is of substantially colloidal fineness, whereby the time and power required in the grinding may be substantially reduced and the ultimate particle size of the cement may also be reduced.

2. In the manufacture of Portland cement, the improvement which consists in adding to the clinker before grinding a small amount of dry carbon black having an estimated average particle size of about 60 millimicrons, whereby the time and power required in the grinding may be substantially reduced and the ultimate particle size of the cement may also be reduced.

3. In the manufacture of Portland cement, the improvement which consists in adding to the clinker before grinding from about 0.08% to about 0.33% of dry carbon black, the particle size of which is of substantially colloidal fineness, whereby the time and power required in the grinding may be substantially reduced and the ultimate particle size of the cement may also be reduced.

4. In the manufacture of Portland cement, the improvement which consists in adding to the clinker before grinding a small amount of dry carbon black, whereby the time and power required in the grinding may be substantially reduced and the ultimate particle size of the cement may also be reduced.

5. An improved process of making concrete of relatively high strength and density which includes the step of grinding clinker with carbon black in granular form in preparing the cement ingredient of the concrete.

6. A new product of manufacture consisting of cement which has been ground in the presence of commercially dustless granular carbon black and is characterized by the property of increasing the density of finished concrete in which it is used.

7. A new product of manufacture consisting of cement which has been ground in the presence of a small amount of dry carbon black and is characterized by the property of increasing the density of finished concrete in which it is used.

8. An improved process of manufacturing cement which is characterized by the step of introducing carbon black in granular form into the clinker mixture prior to the completion of the grinding operation.

GEORGE C. WILSNACK.